United States Patent
Ahmed et al.

(10) Patent No.: US 10,452,947 B1
(45) Date of Patent: Oct. 22, 2019

(54) OBJECT RECOGNITION USING DEPTH AND MULTI-SPECTRAL CAMERA

(71) Applicant: Microsoft Technology Licensing, LLC, Redmond, WA (US)

(72) Inventors: Abdelrehim Ahmed, Santa Clara, CA (US); Sergio Ortiz Egea, San Jose, CA (US); Michael Scott Fenton, Sunnyvale, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/004,072

(22) Filed: Jun. 8, 2018

(51) Int. Cl.
| | |
|---|---|
| G06K 9/46 | (2006.01) |
| H04N 5/33 | (2006.01) |
| G06T 7/514 | (2017.01) |
| G06N 3/08 | (2006.01) |
| G06K 9/20 | (2006.01) |
| G06K 9/62 | (2006.01) |

(52) U.S. Cl.
CPC ......... G06K 9/4661 (2013.01); G06K 9/2036 (2013.01); G06K 9/6257 (2013.01); G06N 3/08 (2013.01); G06T 7/514 (2017.01); H04N 5/332 (2013.01); *G06K 2009/4657* (2013.01); *G06T 2207/10028* (2013.01); *G06T 2207/20076* (2013.01); *G06T 2207/20081* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 9,053,571 B2 * | 6/2015 | Shotton | G06T 17/10 |
| 9,129,277 B2 | 9/2015 | MacIntosh | |

(Continued)

FOREIGN PATENT DOCUMENTS

| | | |
|---|---|---|
| CN | 106570903 A | 4/2017 |
| WO | 2015077493 A1 | 5/2015 |

(Continued)

OTHER PUBLICATIONS

Mikolajczyk, et al., "A performance evaluation of local descriptors", In Journal of IEEE Transactions on Pattern Analysis and Machine Intelligence, vol. 27, Issue 10, Oct. 2005, pp. 1615-1630.

(Continued)

*Primary Examiner* — Reza Aghevli
(74) *Attorney, Agent, or Firm* — Alleman Hall Creasman & Tuttle LLP

(57) ABSTRACT

A camera is configured to output a test depth+multi-spectral image including a plurality of pixels. Each pixel corresponds to one of the plurality of sensors of a sensor array of the camera and includes at least a depth value and a spectral value for each spectral light sub-band of a plurality of spectral illuminators of the camera. An object recognition machine is previously trained with a set of labeled training depth+multi-spectral images having a same structure as the test depth+multi-spectral image. The object recognition machine is configured to output a confidence value indicating a likelihood that the test depth+multi-spectral image includes a specified object.

20 Claims, 9 Drawing Sheets

(56) References Cited

U.S. PATENT DOCUMENTS

| | | | |
|---|---|---|---|
| 9,269,022 B2* | 2/2016 | Rhoads | G06K 9/00208 |
| 9,720,511 B2 | 8/2017 | Melle et al. | |
| 9,818,195 B2 | 11/2017 | Zach | |
| 2010/0183205 A1* | 7/2010 | Pfleger | A61B 3/113 |
| | | | 382/128 |
| 2011/0102566 A1* | 5/2011 | Zakian | A61B 5/0075 |
| | | | 348/66 |
| 2012/0206452 A1* | 8/2012 | Geisner | G02B 27/017 |
| | | | 345/419 |
| 2013/0163879 A1 | 6/2013 | Katz et al. | |
| 2013/0257748 A1* | 10/2013 | Ambrus | G02B 27/0093 |
| | | | 345/173 |
| 2014/0098018 A1* | 4/2014 | Kim | G06F 3/014 |
| | | | 345/156 |
| 2015/0002419 A1* | 1/2015 | White | G06F 3/04847 |
| | | | 345/173 |
| 2015/0098616 A1* | 4/2015 | Gervautz | G06K 9/00624 |
| | | | 382/103 |
| 2015/0123967 A1* | 5/2015 | Quinn | G06T 13/40 |
| | | | 345/420 |
| 2016/0006914 A1* | 1/2016 | Neumann | G06F 3/0325 |
| | | | 348/78 |
| 2018/0046874 A1* | 2/2018 | Guo | G06K 9/3208 |
| 2018/0197274 A1* | 7/2018 | Price | G06T 3/4015 |
| 2018/0197275 A1* | 7/2018 | Price | G06T 3/4015 |
| 2018/0204329 A1* | 7/2018 | Cutu | G06T 5/001 |

FOREIGN PATENT DOCUMENTS

| | | |
|---|---|---|
| WO | 2017177284 A1 | 10/2017 |
| WO | 2018047705 A1 | 3/2018 |

OTHER PUBLICATIONS

Lowe, David G., "Object Recognition from Local Scale-Invariant Features", In Proceedings of Seventh IEEE International Conference on Computer Vision, Sep. 20, 1999, 8 Pages.

Shotton, et al., "TextonBoost: Joint Appearance, Shape and Context Modeling for Mulit-Class Object Recognition and Segmentation", In Proceedings of European Conference on Computer Vision, May 7, 2006, pp. 1-14.

Ortiz Egea, et al., Application as Filed in U.S. Appl. No. 15/991,981, "Face Recognition Using Depth and Multi-Spectral Camera", filed May 29, 2018, 48 Pages.

* cited by examiner

OBJECT RECOGNITION USING DEPTH AND MULTI-SPECTRAL CAMERA

BACKGROUND

Object recognition is a computer vision technology with many potential applications. However, accurately recognizing an object can be extremely difficult to impossible when conditions are not favorable for a particular camera.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A camera is configured to output a test depth+multi-spectral image including a plurality of pixels. Each pixel corresponds to one of the plurality of sensors of a sensor array of the camera and includes at least a depth value and a spectral value for each spectral light sub-band of a plurality of spectral illuminators of the camera. An object recognition machine is previously trained with a set of labeled training depth+multi-spectral images having a same structure as the test depth+multi-spectral image. The object recognition machine is configured to output a confidence value indicating a likelihood that the test depth+multi-spectral image includes a specified object.

DETAILED DESCRIPTION

This description is directed to an object recognition approach that employs an ambient invariant, depth and multi-spectral camera for object recognition. The camera is configured to acquire both depth images and a plurality of spectral light images in different spectral light sub-bands on the same sensor array. By accurately calculating a backscattering (albedo) coefficient for an imaged subject in each of the sub-bands of spectral light, the camera accurately determines a true spectral signature of the subject that is minimally or not biased by ambient light. As such, the limitations of traditional object recognition techniques including time-dependent factors (e.g., pose) and environmental factors (e.g., ambient color temperature or intensity) may be overcome to increase the accuracy of object recognition.

Figure 1A:
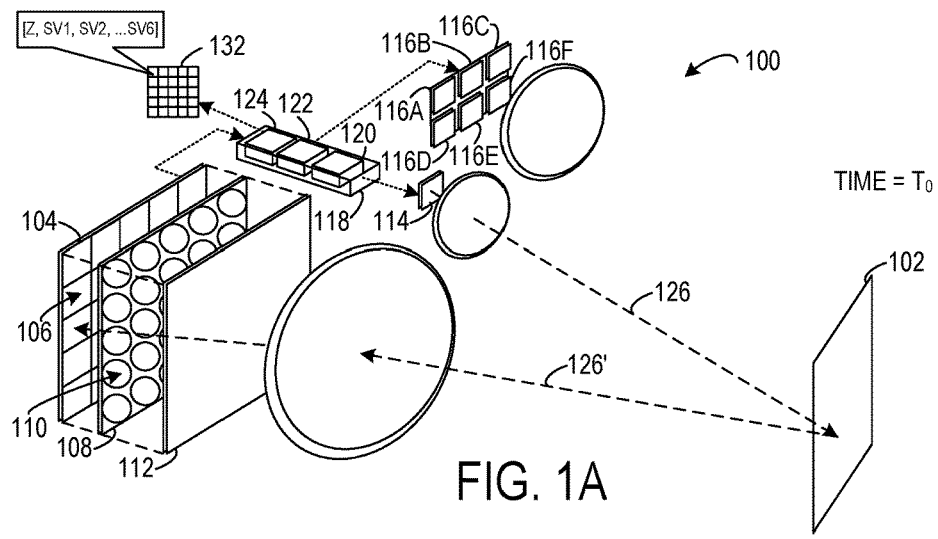
FIGS. 1A-1C are exploded, schematic views showing aspects of an example camera.
Figure 1B:
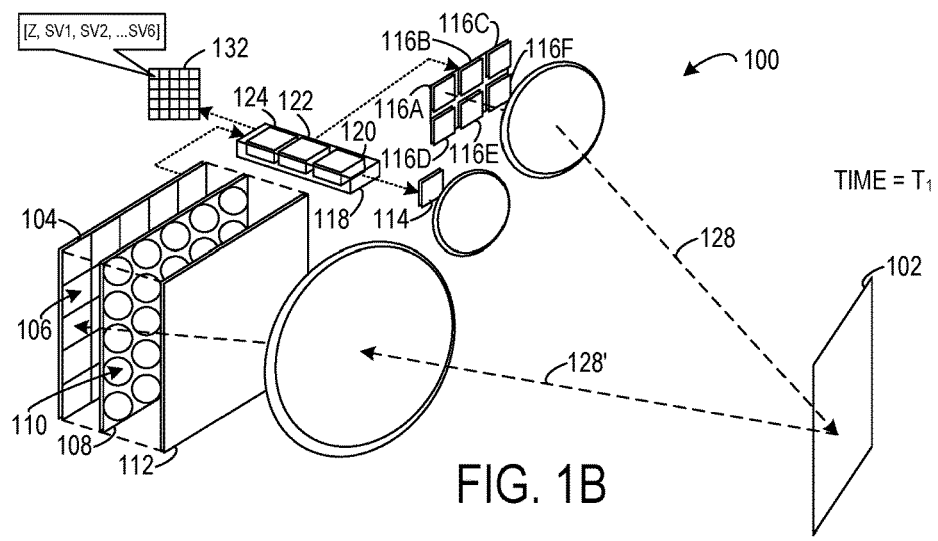
Figure 1C:
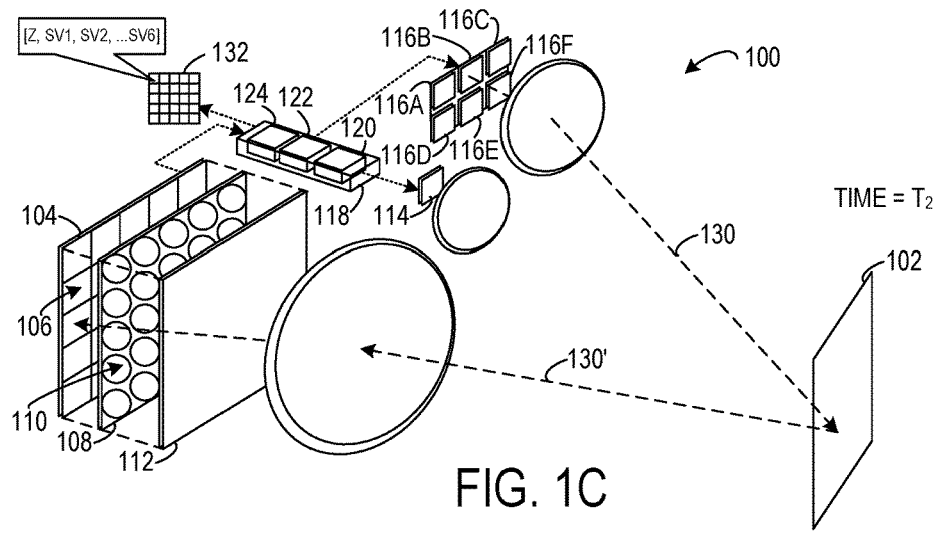

FIGS. 1A-1C shows aspects of an example camera 100. The term 'camera' refers herein to any imaging component having at least one optical aperture and sensor array configured to image a scene or subject 102. Camera 100 includes a sensor array 104 of individually addressable sensors 106. In some implementations, the sensors may be complementary metal-oxide semiconductor (CMOS) elements, but other suitable architectures are envisaged as well. Each sensor is responsive to light over a broad wavelength band. For silicon-based sensors, the wavelength response may range from 300 to 1100 nm, for example. Sensor array 104 is schematically illustrated with only twenty-five sensors 106 for simplicity, although there is no theoretical limitation to the number of sensors 106.

In some implementations, the sensors 106 of sensor array 104 may be differential sensors. Each differential sensor may include different regions that are energized according to two different clock signals. In one example, to measure modulated active illumination, the two clock signals may be substantially complementary (e.g., the two clock signals have 50% duty cycles that are 180 degrees out of phase). In other examples, the two different clock signals may have a different relationship, such as for measuring ambient illumination or non-modulated active illumination. When the different regions are activated based on the corresponding clock signal, electric fields are created that attract and collect photoelectric charges in the different regions. The different regions may be separated by a p-type doped area that creates a barrier that ensures charges collected in one region do not transfer to an adjacent region even if one is at a higher potential.

Such operation allows for the same sensor array to be used to measure active light across a broad spectrum including ultraviolet, visible, NIR, and IR light. Further, the differential sensors may reduce system noise because only one read operation is required to perform a differential measurement of active spectral light and ambient light. In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory.

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented.

Microlens array 108 optionally may be arranged directly over sensor array 104. Microlens array 108 includes a plurality of microlens elements 110. Each microlens element 110 of microlens array 108 may be registered to a differential sensor 106 of the sensor array 104. When included, microlens array 108 may provide a larger effective fill factor at each of the sensors, for increased collection efficiency and reduced cross-talk between pixels.

Optical filter 112 optionally may be arranged over sensor array 104, so as to optically cover the sensor array. When included, the optical filter 112 is switchable electronically between different light-filtering states. In each light-filtering state, the optical filter 112 transmits light in a particular sub-band and blocks light outside of the sub-band from reaching sensors 106 of the sensor array 104. Blocked light may be absorbed, reflected, and/or scattered by the optical filter 112, depending on the implementation. The optical filter 112 may increase a signal-to-noise ratio of IR images and spectral light images acquired by the sensor array 104. The optical filter 112 may include two or more light filtering states. In one filtering state, the optical filter 112 may transmit IR light and block light outside of the IR band (e.g., visible light). In another filtering state, the optical filter 112 may transmit spectral light and block light outside of the spectral light sub-band (e.g., IR light). In some implementations, the optical filter 112 may be configured to switch between a plurality of filtering states that each correspond to a different spectral light sub-band. In each light-filtering state, the optical filter 112 may be configured to transmit light in a spectral light sub-band and block light outside of the spectral light sub-band (e.g., spectral light in other spectral sub-bands). The optical filter 112 may switch between any suitable number of different light-filtering states to transmit any suitable sub-band(s) of light while blocking light outside of the sub-band(s). Example sub-bands that correspond to the different light-filtering states of the optical filter include deep blue (460 nm), blue (470 nm), true green (528 nm), yellow (587 nm), amber (617 nm), red (625 nm), hyper-red (645 nm), far-red (730 nm), and near IR (810 nm).

The optical filter 112 may include any suitable type of filter that transmits a narrow-band of light without significantly reducing the intensity of the in-band signal received by the sensor array. In one example, the optical filter may include a plurality of liquid crystal layers.

An IR illuminator 114 is configured to emit active IR light to illuminate the subject 102. In one example, the IR illuminator 114 includes an IR laser configured to emit IR light. In some implementations, the IR illuminator 114 optionally may include a diffuser covering a field of illumination of the IR illuminator 114.

In some implementations, one or more spectral illuminators 116 optionally may be included to provide active spectral illumination. When included, a plurality of spectral illuminators 116 (e.g., 116A, 116B, 116C, 116D, 116E, 116F) may be configured to emit active spectral light to illuminate the subject 102 in a plurality of different spectral light sub-bands. Each of the spectral illuminators may be individually controllable—e.g., a single spectral illuminator may be activated while the other spectral illuminators remain deactivated. The plurality of spectral illuminators 116 may take any suitable form. In one example, the spectral illuminators 116 include light emitting diodes configured to emit spectral light. There is not a theoretical limit on the number of spectral illuminators that may be used, nor on the spectral-light sub-bands that each spectral illuminator may be configured to emit.

In one example implementation, a camera may include, in addition to the IR source, six spectral illuminators respectively configured to emit deep blue (460 nm), blue (470 nm), true green (528 nm), yellow (587 nm), amber (617 nm), and red (625 nm). In an example implementation, each spectral illuminator may have a full width at half maximum (FWHM) of 20 nm, and a field of illumination (FOI) of 80 degrees. While not required, the camera 100 typically includes more than three spectral illuminators. In some implementations, the spectral illuminators may emit light in other sub-bands, such as hyper-red, near IR, or IR.

In other implementations, a camera may include a broad-band illumination source, such as a white light source. The broad-band illumination source may be employed instead of the plurality of spectral illuminators. In some implementations, the broad-band illumination source may be modulated. In other implementations, the broad-band illumination source may be un-modulated.

Electronic controller 118 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded. Electronic controller 118 includes a depth controller machine 120, a spectral controller machine 122, and an output machine 124. Machines 120, 122, 124 may be implemented as separate physical hardware and/or firmware components or incorporated into a single hardware and/or firmware component.

The depth controller machine 120 is configured to activate the IR illuminator 114 and synchronously address the sensors 106 of sensor array 104 to acquire IR images. When optical filter 112 is included, the depth controller machine 120 is further configured to switch the optical filter 112 to block spectral light outside of the IR light sub-band in synchronicity with activation of the IR illuminator 114 and address of the sensor array 104. In the example shown in FIG. 1A, at time $T_0$, the depth controller machine 120 adjusts the optical filter 112, activates the IR illuminator 114 to illuminate the subject 102 with active IR light 126, and addresses the sensors 106 of sensor array 104 in synchronicity. IR light 126' reflects from the subject 102 back to the camera 100, is transmitted through the optical filter 112, and is incident on the sensors 106 of the sensor array 104 for IR image acquisition. Note that the depth controller machine 120 may acquire a plurality of IR images in the process of acquiring a depth map.

FIG. 1B shows camera 100 measuring a spectral light sub-band emitted by a first spectral illuminator 116A at time $T_1$. The spectral controller machine 122 is configured to sequentially activate the plurality of spectral illuminators 116 one at a time, adjust the optical filter 112, and synchronously address the sensors 106 of sensor array 104. In some implementations, the spectral controller machine 122 may be configured to, for each spectral image acquisition, modulate the frequency of the spectral illuminators 116 in the 100 kilohertz (Khz) to low megahertz (MHz) domain in order to differentially measure the active spectral light and ambient light. Such operation may allow for acquisition of an accurate spectral signature of the subject being imaged.

In the example shown in FIG. 1B, at time $T_1$, the spectral controller machine 122 activates a first spectral illuminator 116A to illuminate the subject 102 in spectral light 128 in a sub-band (e.g., blue) of the spectral illuminator 116A, synchronously adjusts the optical filter 112 to block spectral light outside of the spectral light sub-band of the first spectral illuminator 116A, and addresses the sensors 106 of sensor array 104. Spectral light 128' reflects from the subject 102 back to the camera 100, is transmitted through the optical filter 112, and is incident on the exact same sensors 106 used to measure the depth to object 102. In FIG. 1B, the same sensors are used for spectral light image acquisition in the spectral light sub-band (e.g., blue) of the spectral illuminator 116A.

Further, as shown in FIG. 1C, at time $T_2$, the spectral controller machine 122 activates a second spectral illuminator 116B to illuminate the subject 102 with spectral light 130 in a sub-band (e.g., green) of the spectral illuminator 116B, synchronously switches the optical filter 112 to block spectral light outside of the spectral light sub-band of the second spectral illuminator 116B, and addresses the exact same sensors 106 of sensor array 104. Spectral light 130' reflects from the subject 102 back to the camera 100, is transmitted through the switchable filter 112, and is incident on the differential sensors 106 of the sensor array for spectral light image acquisition in the sub-band (e.g., green) of the spectral illuminator 116B. The spectral controller machine 122 may sequentially activate the plurality of spectral illuminators 116 one at a time in synchronicity with adjusting the optical filter 112, and addressing of the sensor array 104 to acquire spectral light images in each of the plurality of sub-bands of the spectral illuminators 116.

Figure 2A:
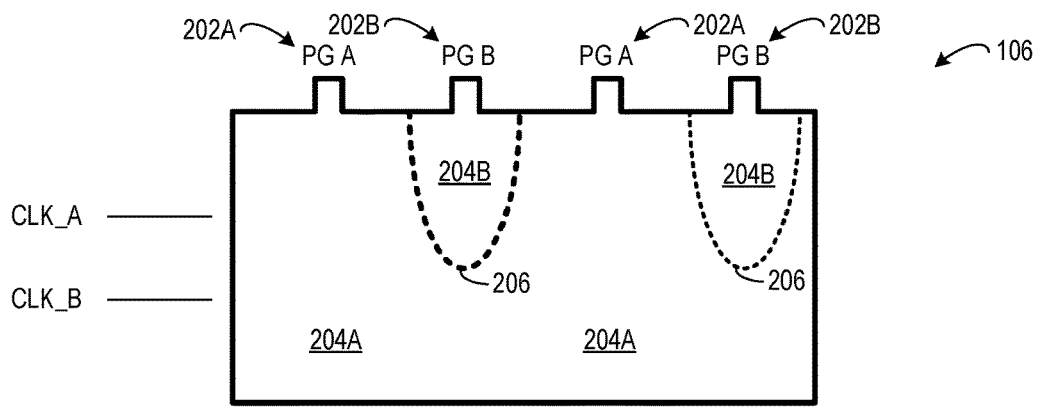
FIGS. 2A-2C schematically show a differential sensor of a sensor array.
Figure 2B:
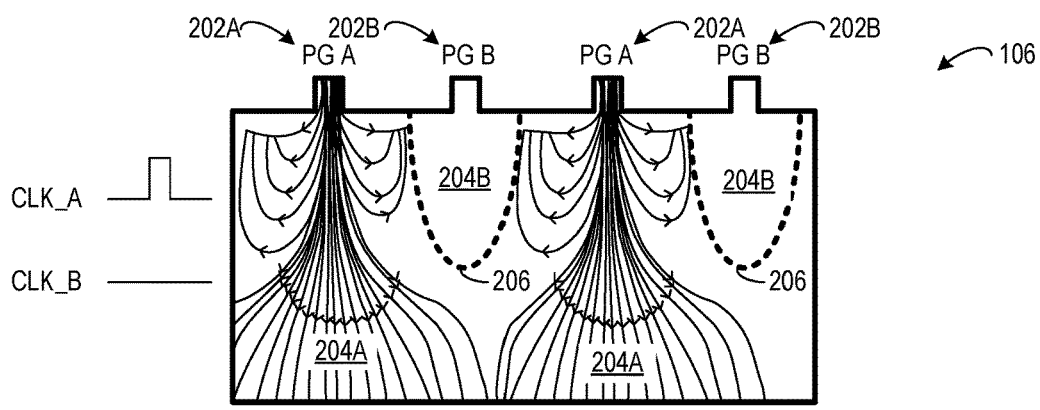
Figure 2C:
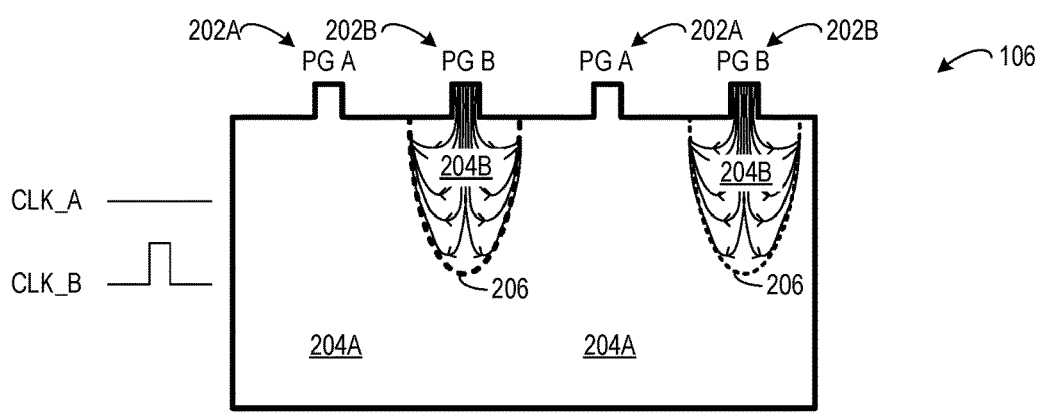

In some implementations, the sensors 106 of sensor array 104 may be differential sensors. FIGS. 2A, 2B, and 2C are cross-sectional views showing aspects of an example differential sensor 106 of sensor array 104 that may be implemented in an ambient light-invariant, depth+multi-spectral camera, such as the camera 100 shown in FIG. 1. The differential sensor 106 includes first and second polysilicon gates (PG A, PG B) 202A, 202B. The polysilicon gates 202A may be energized according to clock signal Clk_A and polysilicon gates 202B may be energized according to clock signal Clk_B. The two clock signals may be controlled differently to control the sensor array to measure different types of illumination. For example, to measured active modulated illumination the two clock signals may be substantially complementary (e.g., Clk_A and Clk_B have 50% duty cycles that are 180 degrees out of phase). In other examples, the two clock signals may have a different relationship, such as for measuring ambient illumination or non-modulated active illumination.

When activated based on the clock signals, the polysilicon gates 202A, 202B create electric fields that respectively attract and collect photoelectric charges in different respective regions 204A, 204B of the differential sensor 106 corresponding to the different polysilicon gates based on the arrival time under the polysilicon gate oxide in the region 204A, 204B. In particular, collected photoelectric charges remain under the gate where the photoelectric charges are initially collected and ultimately diffuse slowly by self-repulsion under each polysilicon gate to a collection node. A p-type doped area 206 between the different regions creates a potential barrier that ensures charges collected by one polysilicon gate do not transfer to an adjacent polysilicon gate even if one is at a higher potential.

In FIG. 2A, both of the clock signals Clk_A and Clk_B are biased to a low voltage such that the polysilicon gates 202A, 202B collect little or no photoelectric charge in the regions 204A, 204B. In FIG. 2B, clock signal Clk_A is biased to a high voltage and Clk_B is biased to a low voltage. When the Clk_A goes high, the polysilicon gates 202A become energized and photoelectric charge is collected in region 204A as indicated by the electric field lines. The electric field lines run tangent to the boundary of region 204A, so charge does not transfer from region 204A to region 204B. Also, since Clk_B is biased low, the polysilicon gates 202B are not energized, and thus minimal photoelectric charge is collected in region 204B. In FIG. 2C, clock signal Clk_B is biased to a high voltage and Clk_A is biased to a low voltage. When the Clk_B goes high, the polysilicon gates 202B become energized and photoelectric charge is collected in region 204B as indicated by the electric field lines. The electric field lines run tangent to the boundary of region 204B, so charge does not transfer from region 204B to region 204A. Also, since Clk_A is biased low, the polysilicon gates 202A are not energized, and thus minimal photoelectric charge is collected in region 204A.

The differential sensor 106 is configured to collect and assign photoelectric charge in synchronicity with modulation of clock signals Clk_A and Clk_B. The photoelectric charge assignment (classification to PG A or B) in the differential sensor 106 occurs simultaneously with charge collection under the polysilicon gates 202A, 202B, and therefore does not require the additional step of shifting charges from one gate to another gate. As such, a differential measurement may be performed during a single integration/readout cycle. In one example, the differential spectral measurement can be performed by synchronously activating a designated spectral illuminator within the 50% time period when the polysilicon gates 202A are energized to collect photoelectric charge from the active illumination in the region 204A. Additionally, the ambient light measurement can be performed by energizing the polysilicon gates 202B while the designated spectral illuminator is deactivated to collect photoelectric charge from the ambient light in the region 204B. The photoelectric charge collected by the region 204B (i.e., the amount of ambient light) is subtracted from the photoelectric charge collected by the region 204A (i.e., the amount of active light and ambient light) to determine a differential measurement in which the ambient light bias is significantly reduced or removed from the measurement of the active illumination. Note this example applies to a scenario where modulated active illumination and ambient illumination are differentially measured.

Such operation allows for the same sensor array to be used to measure active light across a broad spectrum including ultraviolet, visible, NIR, and IR light. Further, the differential sensors may reduce system noise because only one read operation is required to perform a differential measurement of active spectral light and ambient light. In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory.

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented.

The term 'address' as applied to sensors 106 of sensor array 104 may have a somewhat different meaning depending on the imaging mode described. For flat-imaging—for spectral light including both visible and IR light—addressing the sensors 106 may include integrating the intensity of active light in the sub-band emitted from the designated spectral (or IR) illuminator and received at each sensor 106 and associating the integrated intensity of the active light in the sub-band with the portion of the image corresponding to that sensor.

For depth imaging, the sensors 106 may be addressed differently. Here, addressing the sensors may include resolving a phase offset from each sensor relative to the modulated intensity of the IR light. The phase offset, optionally converted into the depth domain, may be associated with the portion of the image corresponding to the sensor addressed. In other words, the depth controller machine 120 may be configured to determine a depth value for each sensor 106 of the sensor array 104. In some implementations, a series of IR image acquisitions (e.g., 6-9) in rapid succession may be used to obtain the phase offset. In combination depth- and flat-imaging applications, both of the above addressing modes may be used in a multiplexed manner.

The phase-discriminating time-of-flight (ToF) approach described above is one of several depth-imaging technologies encompassed by this disclosure. In general, a depth-imaging camera may be configured to acquire one or more depth maps of a scene or subject. The term 'depth map' refers to an array of pixels registered to corresponding regions ($X_i$, $Y_i$) of an imaged scene, with a depth value ($Z_i$) indicating, for each pixel, the depth of the corresponding region. 'Depth' is defined as a coordinate parallel to the optical axis of the camera, which increases with increasing distance from the camera. The term 'depth video' refers herein to a time-resolved sequence of depth maps. In ToF implementations, the IR illumination source may project pulsed or otherwise modulated IR illumination towards the subject. The sensor array of the depth-imaging camera may be configured to detect the phase offset between the illumination reflected back from the subject and the modulated emission. In some implementations, the phase offset of each sensor may be converted into a pixel-resolved time of flight of the pulsed illumination, from the illumination source to the subject and then back to the array. ToF data may then be converted into depth data.

The term 'spectral light image' refers to a matrix of pixels registered to corresponding regions ($X_i$, $Y_i$) of an imaged scene, with a spectral value ($SV_i$) indicating, for each pixel, the spectral signature of the corresponding region in the particular spectral light sub-band. For acquiring the spectral light images in each of the sub-bands (e.g., for a multi-spectral image), the spectral controller machine 122 is configured to determine a spectral value for each of the differential sensors based on the depth value and a differential measurement of active spectral light and ambient light for the differential sensor.

The depth and multi-spectral data acquired by the camera 100 may be used to fit a neighborhood of pixels to a regular surface (e.g., Lambertian plane, quadric surface), and solve the backscattering (albedo) coefficient for each of the sub-bands in order to calculate a spectral signature of the surface that is ambient light-invariant and can be robustly classified. In such calculations, the depth data may be used to account for a reduction in light intensity due to optical transmission of the light from the light source (IR illuminator 114 or spectral illuminators 116) to the subject 102. In some implementations, the spectral controller machine 122 may be configured to calculate a surface normal for each pixel of the plurality of pixels of the senor array based on the depth data. A set of surface normals for the plurality of pixels may represent a surface of an imaged subject modeled by an analytic function (e.g., plane or quadric). In some implementations, the spectral controller machine 122 may be configured to calculate a curvature for each pixel of the plurality of pixels of the senor array based on the depth data. A set of curvatures for the plurality of pixels may represent a surface of an imaged subject modeled by an analytic function (e.g., plane or quadric). The spectral controller machine 122 may be configured to normalize the spectral light measurements in the different spectral light sub-bands based on one or more of the measured depth and the surface normal. This provides a position- and light-invariant spectral signature of an imaged subject.

Output machine 124 is configured to output a matrix of pixels 132 referred to herein as a test depth+multi-spectral image. Each pixel in the matrix includes the depth value ($Z_i$) and the spectral value (e.g., $SV1_i$, $SV2_i$, ... $SV6_i$) for each of the spectral light sub-bands of the plurality of spectral illuminators 116 of the camera 100. In some implementations, the output machine 124 may be further configured to, for each pixel, output a surface normal and/or a curvature. The output machine 124 may be configured to output the matrix of pixels 132 in any suitable form. In some examples, the output machine 124 may output the matrix of pixels 132 as a data structure in which each element of the matrix corresponds to a different pixel, and each element of the matrix includes an array of values corresponding to the depth value and the spectral values for that pixel. Note that a spectral value for the IR light sub-band may be determined for each differential sensor in the process of determining the depth value, and thus each pixel in the matrix may include a spectral value for the IR light sub-band. Further, note that the output machine 124 may be configured output the matrix of pixels 132 (and/or any other suitable parameter value) to any suitable recipient internal or external to the camera 100. In one example, the output machine 124 may be configured to output the matrix of pixels 132 to another processing component for additional image processing (e.g., filtering, computer vision). In some examples, the processing component may be incorporated into the camera 100. In some examples, the processing component may be incorporated into a remote computing device in communication with the camera 100. In another example, the output machine 124 may be configured to output the matrix of pixels 132 to an external display device for visual presentation as an image.

The test depth+multi-spectral image 132 generated by the camera 100 may provide richer and more accurate information than separate depth and/or multi-spectral images generated by prior approaches. For example, the test depth+multi-spectral image 132 provides a spectral signature that is invariant to time-dependent factors and environmental factors. Such a depth+multi-spectral image may be leveraged to perform image analysis for visual object recognition. In particular, the rich data of the depth+multi-spectral image may be used to recognize different types of object features or landmarks that in combination can be used to provide a more accurate assessment of a likelihood that a depth+multi-spectral image includes a specified object.

Figure 3:
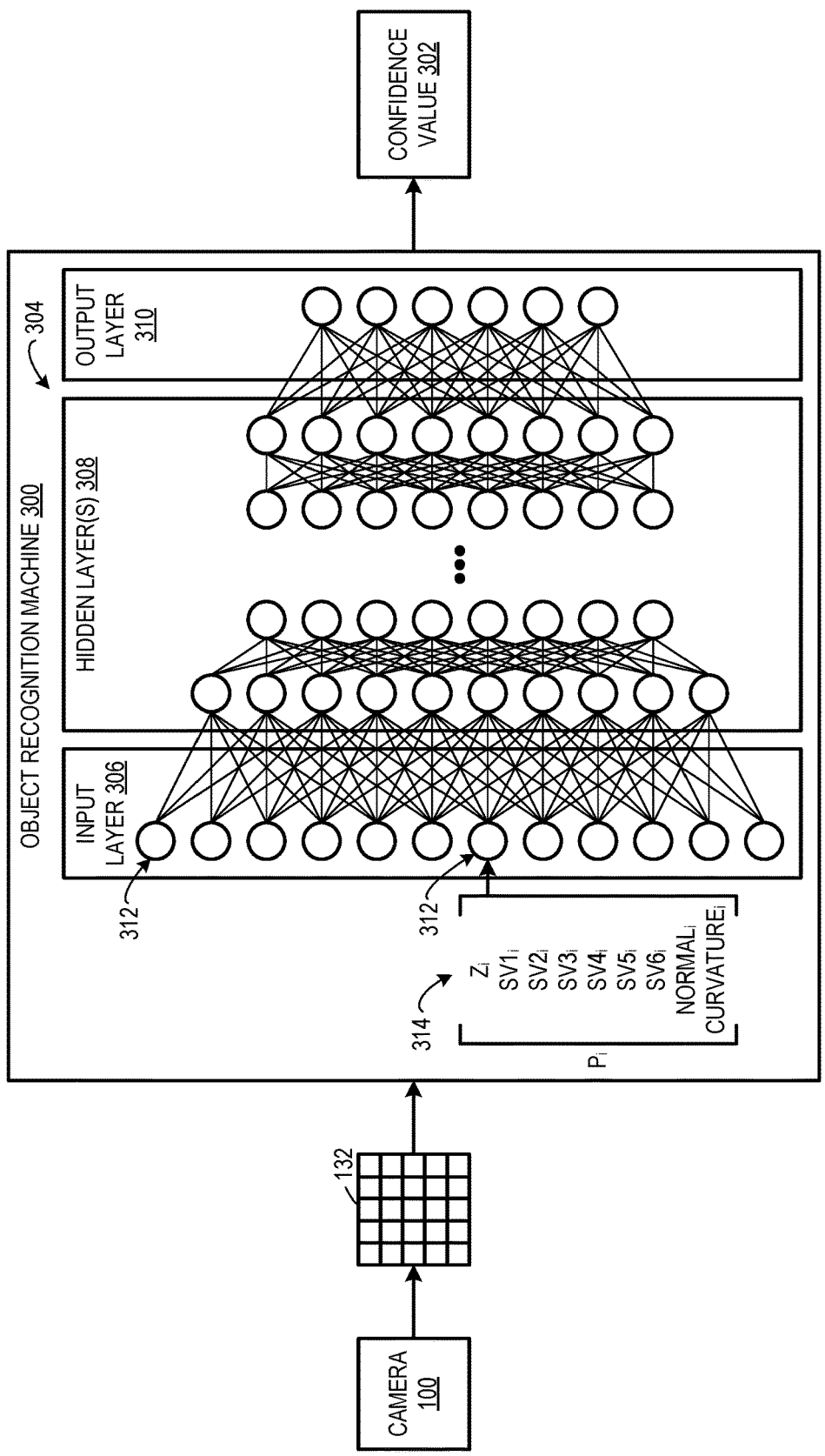
FIG. 3 schematically shows aspects of an example object recognition machine configured to use a convolutional neural network to recognize a specified object in a depth+multi-spectral image.

As shown in FIG. 3, camera 100 may be configured to output the test depth+multi-spectral image 132 to an object recognition machine 300 configured to output a confidence value 302 indicating a likelihood that the test depth+multi-spectral image 132 includes a specified object. Object recognition machine 300 may be configured to recognize any suitable type of specified object in a test depth+multi-spectral image. In some implementations, object recognition machine 300 may be configured to recognize a plurality of different types of objects in a test depth+multi-spectral image. For example, object recognition machine 300 may be configured to recognize people, animals, plants, buildings, vehicles, locations, or any other suitable specified object or entity. Moreover, object recognition machine 300 may be configured to recognize different parts or features of a specified object. For example, object recognition machine 300 may be configured to recognize different human body parts, such as a head, face, arm, or leg. Object recognition machine 300 may be configured to recognize any suitable part or feature of a specified object.

Object recognition machine 300 may employ any suitable combination of state-of-the-art and/or future machine learning (ML) and/or artificial intelligence (AI) techniques. Non-limiting examples of techniques that may be incorporated in an implementation of object recognition machine 300 include support vector machines, multi-layer neural networks, convolutional neural networks (e.g., including spatial convolutional networks for processing images and/or videos), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

In some examples, the methods and processes utilized by object recognition machine 300 may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters may be adjusted through any suitable training procedure, in order to continually improve functioning of object recognition machine 300.

Non-limiting examples of training procedures for object recognition machine 300 include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or based on generative adversarial neural network training methods. In some examples, a plurality of components of object recognition machine 300 may be trained simultaneously with regard to an objective function measuring performance of collective functioning of the plurality of components (e.g., with regard to reinforcement feedback and/or with regard to labeled training data), in order to improve such collective functioning. In some examples, one or more components of object recognition machine 300 may be trained independently of other components (e.g., offline training on historical data). For example, object recognition machine 300 may be trained via supervised training on labeled training data comprising a set of depth+multi-spectral images having a same structure as the test depth+multi-spectral image 132. In other words, the training data comprises the same type of images as the images generated by camera 100. The set of training data may be labeled with labels indicating whether or not a specified object is present in the corresponding depth+multi-spectral image. In some implementations, the labels may indicate locations of any specified object(s) present within such images. In some implementations, each pixel in each depth+multi-spectral image of the set of training data may be labeled with a different specified object or descriptive category. Labeling the set of training data in this manner may enable object recognition machine 300 to be trained to perform semantic segmentation of a test depth+multi-spectral image. In other words, object recognition machine 300 may be configured to output, for each pixel of the test depth+multi-spectral image, a plurality of confidence values corresponding to a plurality of different types of objects. Each confidence value may indicate a likelihood that the pixel is included in that type of object. Object recognition machine 300 may be trained via supervised training on the set of training data with regard to an objective function measuring an accuracy, precision, and/or recall of locating specified object by object recognition machine 300 as compared to actual locations of specified object(s) indicated in the labeled training data.

In the illustrated example, object recognition machine 300 uses a convolutional neural network 304 to determine the confidence value 302. Convolutional neural network 304 includes a plurality of layers including an input layer 306, one or more hidden layers 308, and an output layer 310. Input layer 306 includes a plurality of input nodes 312. Each input node 312 is configured to receive a pixel value array 314 corresponding to a different pixel ($P_i$) of the plurality of pixels of the test depth+multi-spectral image 132. The pixel value array 314 may include a plurality of pixel parameter values including the depth value ($Z_i$) and the plurality of multi-spectral values ($SV1_i, \ldots SV6_i$) for the pixel. In some implementations, the pixel value array 314 may further include a surface normal calculated for the pixel. In some implementations, the pixel value array 314 may further include a curvature calculated for the pixel.

Convolutional neural network 304 is configured to convolve input vectors with one or more predefined, randomized and/or learned convolutional kernels included in hidden layer(s) 308. By convolving the convolutional kernels with an input vector (e.g., representing depth+multi-spectral image 132), the convolutional neural network 304 may detect a feature associated with the convolutional kernel. For example, a convolutional kernel may be convolved with a test depth+multi-spectral image to detect low-level visual features such as lines, edges, corners, etc., based on various convolution operations with a plurality of different convolutional kernels. Convolved outputs of the various convolution operations may be processed by a pooling layer (e.g., max pooling) which may detect one or more most salient features of the input image and/or aggregate salient features of the input image, in order to detect salient features of the input image at particular locations in the input image. Pooled outputs of the pooling layer may be further processed by further convolutional layers.

Convolutional kernels of further convolutional layers may recognize higher-level two dimensional (2D) visual features, e.g., shapes and patterns, and more generally spatial arrangements of lower-level visual features. Some layers of the convolutional neural network may accordingly recognize and/or locate 2D visual features of the specified object for which object recognition machine 300 is trained to recognize. For example, if object recognition machine 300 is trained to recognize bicycles, then convolution kernels of some convolutional layers may recognize and/or locate 2D visual features of a bicycle (e.g., wheels, seat, fork). Convolutional kernels of further convolutional layers may recognize three-dimensional (3D) visual features, e.g., curvature maps. Returning to the above example, some layers of the convolutional neural network may accordingly recognize and/or locate 3D visual features of bicycles (e.g., pedals, handle bars). Some layers of the convolutional neural network may accordingly recognize and/or locate different textures. Convolutional kernels of further convolutional layers may recognize spectral features within the visible spectrum and outside of the visible spectrum (e.g. ultraviolet, infrared). Some layers of the convolutional neural network may accordingly recognize and/or locate spectral features of a specified object (e.g., paint color). The spectral features may be invariant to temporal factors (e.g., pose) and environmental factors (e.g., ambient lighting). Furthermore, some layers of the convolutional neural network may recognize combined spectral—spatial features based on 2D, 3D, and spectral information.

The pooled outputs of the hidden layer(s) 308 may be output to the output layer 310. The output layer 310 may be configured to output the confidence value 302 indicating the likelihood that the test depth+multi-spectral image includes a specified object based on the processing performed by the different hidden layers 308. Accordingly, the convolutional neural network 304 may recognize specified objects in a test image input to the convolutional neural network.

Although the foregoing example is described with regard to a convolutional neural network, other neural network techniques may be able to detect and/or locate specified object and other salient features based on detecting low-level 2D visual features, 2D higher-level visual features, 3D visual features, spectral features, and/or spatial arrangements of visual features.

Figure 4:
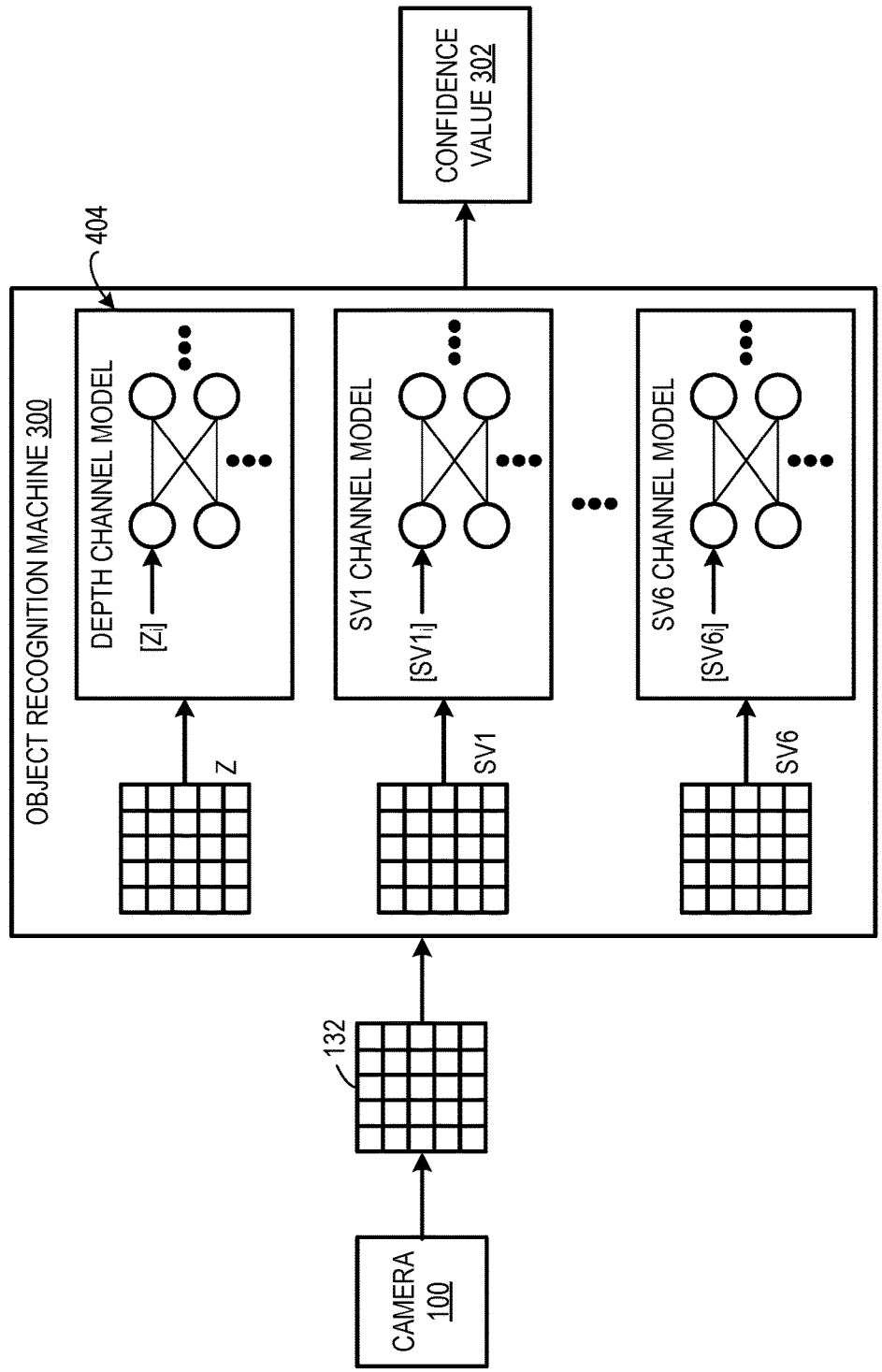
FIG. 4 schematically shows aspects of an example object recognition machine configured to use a plurality of channel-specific models to recognize a specified object in a depth+multi-spectral image.

In some implementations, object recognition machine 300 optionally may be configured to process the different pixel parameter values of the test depth+multi-spectral image separately on a channel-by-channel basis. As shown in FIG. 4, object recognition machine 300 may use a plurality of models including channel-specific models 404 to determine the confidence value 302 that indicates the likelihood that the test depth+multi-spectral image 132 includes a specified object. For example, object recognition machine 300 may be trained via supervised training on labeled training data comprising a set of depth+multi-spectral images having a same structure as the test depth+multi-spectral image 132. The set of training data may be labeled with labels indicating whether or not a specified object is present in such images. In some implementations, the labels may indicate the location of any specified object(s) present within such images.

The plurality of channel-specific models (e.g., DEPTH CHANNEL MODEL, SV1 CHANNEL MODEL, . . . , SV6 CHANNEL MODEL) 404 each may be configured to process a different pixel parameter for the plurality of pixels of the test depth+multi-spectral image 132. For example, depth values of the test depth+multi-spectral image 132 may be processed by the DEPTH CHANNEL MODEL. As another example, spectral values of spectral light in a first spectral light sub-band corresponding to the first spectral illuminator 116A of the camera 100 may be processed by the SV1 CHANNEL MODEL. Each channel-specific model 404 includes a plurality of input nodes, and, for each channel-specific model, each input node is configured to receive a pixel parameter value for a different pixel of the plurality of pixels of the test depth+multi-spectral image 132. For example, each input node of the DEPTH CHANNEL MODEL may be configured to receive a depth value $[Z_i]$ for a different pixel of the plurality of pixels of the test depth+multi-spectral image 132. In other words, the DEPTH CHANNEL MODEL may receive a 2D input vector of depth values corresponding to the matrix of pixels as input. As another example, each input node of the SV1 CHANNEL MODEL may be configured to receive a spectral value $[SV1_i]$ for a different pixel of the plurality of pixels of the test depth+multi-spectral image 132. In other words, the SV1 CHANNEL MODEL may receive a 2D input vector of spectral values in the first spectral light sub-band corresponding to the matrix of pixels as input.

The plurality of channel-specific models 404 may process the different types of pixel parameter values in a similar manner as described above. For example, 2D visual features and spectral features may be identified by the different channel-specific models that processes the spectral values (e.g., SV1-SV6), and 3D visual features and textures may be identified by the channel-specific model that processes the depth values. It will be appreciated that the object recognition machine may use any suitable type of model(s) arranged in any suitable manner to determine the confidence value 302.

In some implementations, object recognition machine 300 optionally may be configured to determine the confidence value 302 using a statistical model. For example, the statistical model may include a support vector machine that may be configured to analyze the test depth+multi-spectral image by applying a series of different binary classifiers to determine whether or not the test depth+multi-spectral image includes a specified object. The support vector machine may be trained using a set of training depth+multi-spectral images, each marked as either including a specified object or not including a specified object. In another example, object recognition machine 300 optionally may be configured to use a statistical model that includes a nearest neighbor algorithm to determine the confidence value 302.

In some implementations, object recognition machine 300 optionally may be configured to recognize a plurality of different types of specified objects in a test depth+multi-spectral image. In such implementations, object recognition machine 300 may be trained on a set of training data that includes depth+multi-spectral images that are labeled with labels indicating whether or not the plurality of different types of specified objects are present in the corresponding depth+multi-spectral images. In some implementations, object recognition machine 300 may include two or more different sub-machines each trained to recognize a different type of object. In such implementations, a test depth+multi-spectral image may be analyzed by the different sub-machines (in series or parallel) to recognize different types of object within the test depth+multi-spectral image.

Figure 5:
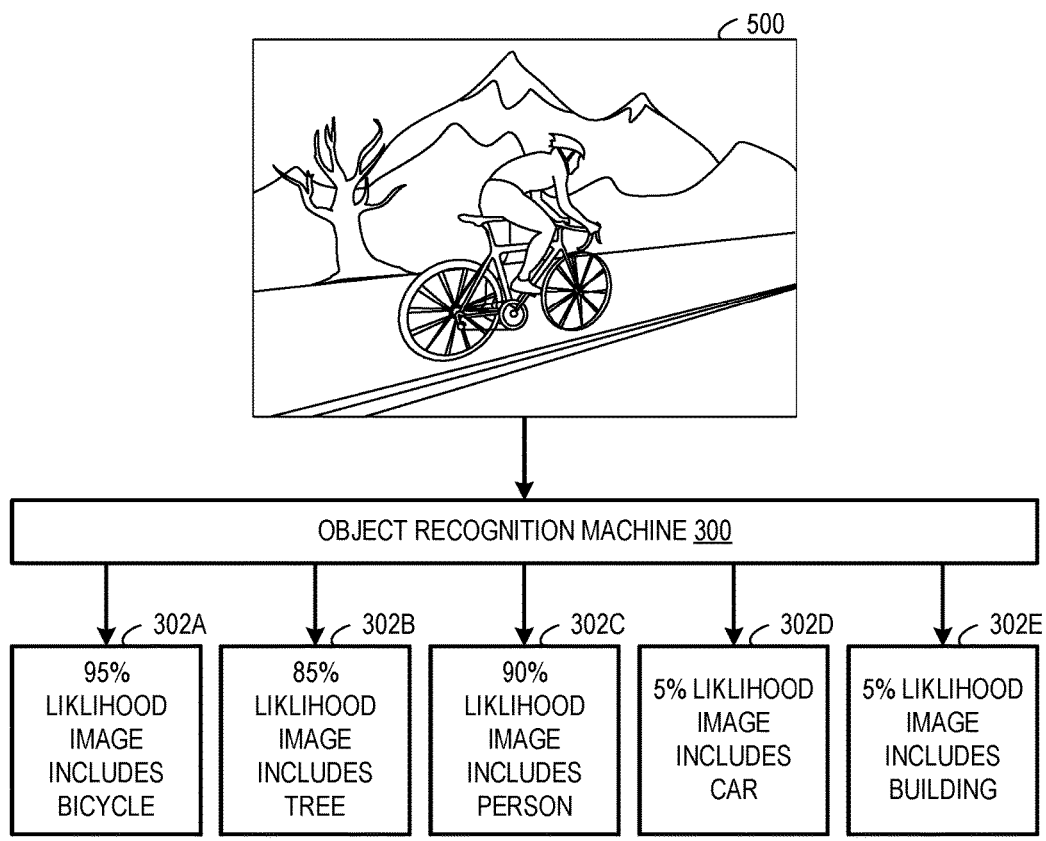
FIGS. 5-7 schematically shows different example outputs of an example object recognition machine.

In the example shown in FIG. 5, object recognition machine 300 receives as input a test depth+multi-spectral image 500. Object recognition machine 300 may analyze test depth+multi-spectral image 500 to determine whether the test depth+multi-spectral image includes different types of specified objects for which the object recognition machine is trained to recognize. Object recognition machine 300 outputs a plurality of confidence values 302 (e.g., 302A, 302B, 302C, 302D, 30E). Each confidence value 302 corresponds to a different type of specified object that object recognition machine 300 is trained to recognize. Each confidence value 302 indicates the likelihood that test depth+multi-spectral image 500 includes that type of specified object. In particular, in the illustrated example, object recognition machine 300 outputs a first confidence value 302A indicating that there is a 95% likelihood that test depth+multi-spectral image 500 includes a bicycle, a second confidence value 302B indicating that there is an 85% likelihood that test depth+multi-spectral image 500 includes a tree, a third confidence value 302C indicating that there is a 90% likelihood that test depth+multi-spectral image 500 includes a person, a fourth confidence value 302D indicating that there is a 5% likelihood that test depth+multi-spectral image 500 includes a car, and a fifth confidence value 302E indicating that there is a 5% likelihood that test depth+multi-spectral image 500 includes a building. Note that these different types of object are provided as examples and object recognition machine 300 may be configured to recognize any suitable number and/or type of different specified objects.

In some examples, object recognition machine 300 optionally may be configured to output labels that indicate that test depth+multi-spectral image 500 includes various specified object based on the confidence value for that object being greater than a threshold value (e.g., 75%). Such labels may be used for image classification of different test depth+multi-spectral images analyzed by object recognition machine 300.

Figure 6:
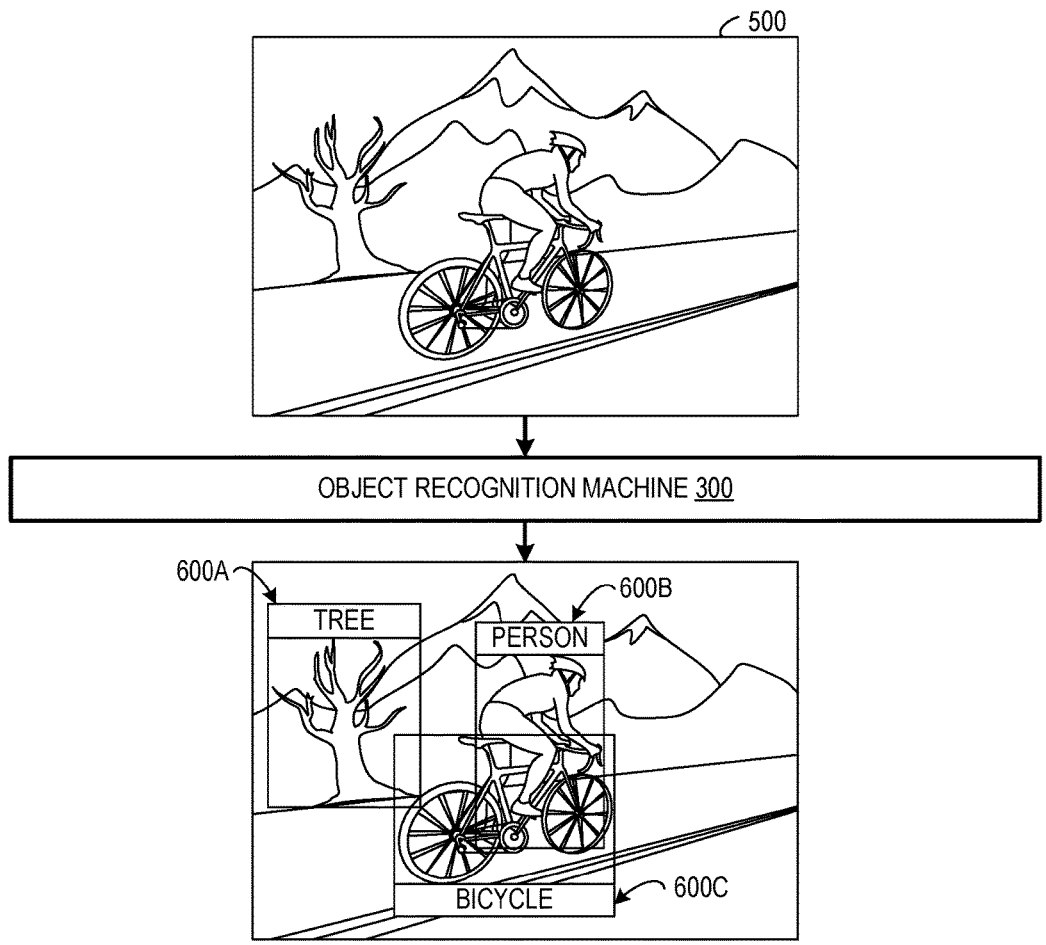

In some implementations, object recognition machine 300 optionally may be configured to output a location on the test depth+multi-spectral image of each recognized object. In other words, object recognition machine 300 optionally may be configured to perform object detection in test depth+multi-spectral images. In one example, as shown in FIG. 6, object recognition machine 300 receives as input test depth+multi-spectral image 500. Object recognition machine 300 may analyze test depth+multi-spectral image 500 to determine whether the test depth+multi-spectral image includes different types of specified objects for which the object recognition machine is trained to recognize. Object recognition machine 300 outputs a plurality of locations on test depth+multi-spectral image 500 of each recognized object. For example, object recognition machine 300 may output a plurality of bounding boxes 600 (e.g., 600A, 600B, 600C) around a plurality of recognized objects. In particular, object recognition machine 300 outputs a first bounding box 600A around a recognized tree, a second bounding box 600B around a recognized person, and a third bounding box 600C around a recognized bicycle. The sizes of the different bounding boxes may be determined in any suitable manner. In some examples, object recognition machine 300 optionally may output labels that indicate the objects that are recognized in the bounding boxes 600, such as a 'tree', a 'person' and a 'bicycle.' While FIG. 6 shows the bounding boxes drawn on the image, this is not required. Object recognition machine 300 optionally may output coordinates of the bounding boxes (e.g., a coordinate for a top-left corner and a bottom-right corner). In some examples, object recognition machine 300 optionally may output a size of each recognized object. In some examples, object recognition machine 300 optionally may output other forms of location information that indicates the locations of the recognized objects.

Figure 7:
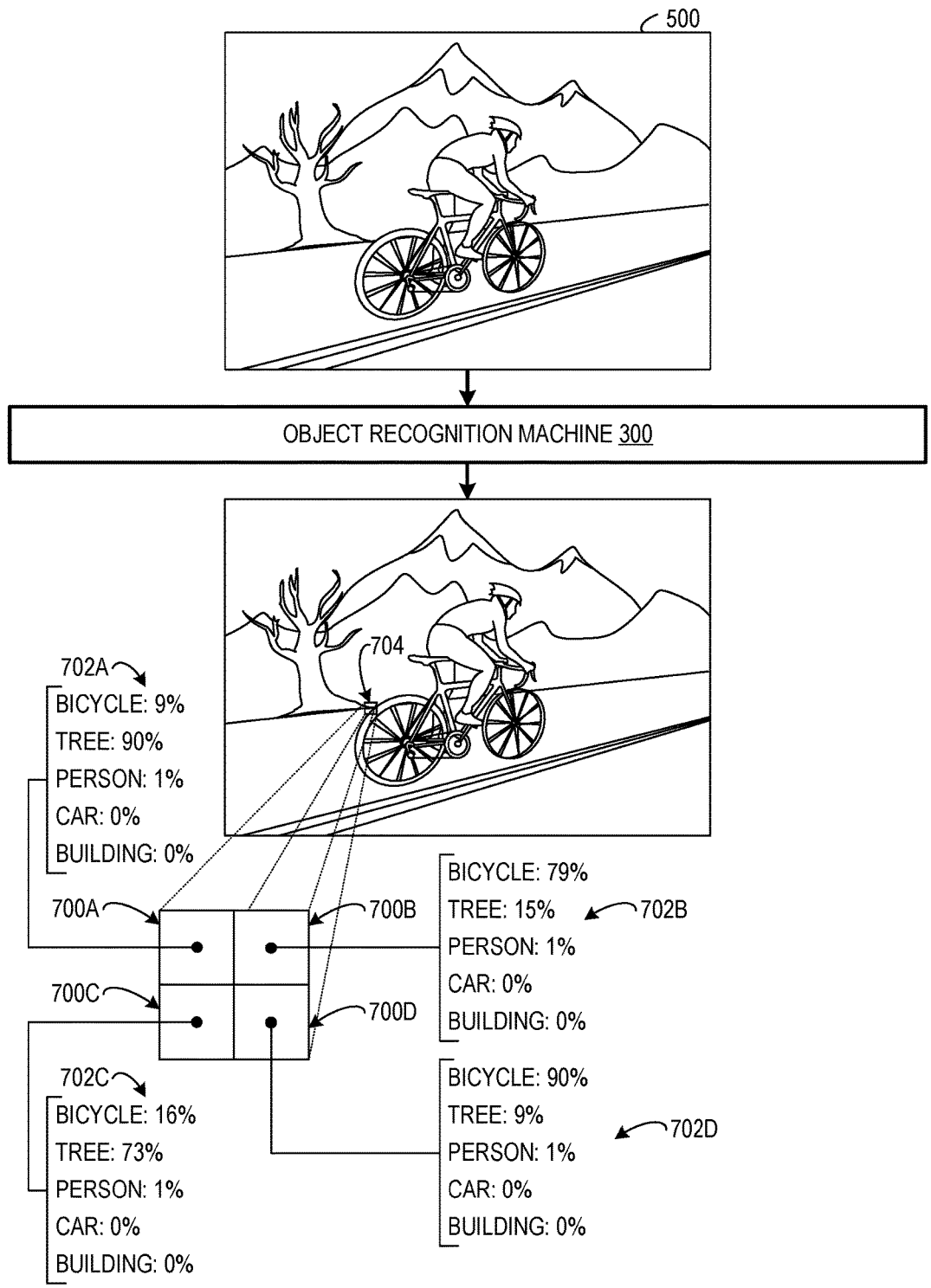

In some implementations, object recognition machine 300 optionally may be configured to output, for each pixel of the test depth+multi-spectral image, a plurality of confidence values corresponding to the plurality of different types of objects for which object recognition machine 300 is trained to recognize. Each confidence value may indicate a likelihood that the pixel is included in that type of recognized object. In other words, object recognition machine 300 optionally may be configured to perform semantic segmentation of the test depth+multi-spectral image. In the example shown in FIG. 7, object recognition machine 300 receives as input test depth+multi-spectral image 500. Object recognition machine 300 may analyze test depth+multi-spectral image 500 to determine whether the test depth+multi-spectral image includes different types of specified objects for which the object recognition machine is trained to recognize. Object recognition machine 300 outputs, for each pixel 700 of test depth+multi-spectral image 500, a plurality of confidence values 702. In the illustrated example, four representative pixels 702A, 702B, 702C, 702D from a representative region 704 of test depth+multi-spectral image 500 are enlarged for ease of view. Pixels 702A, 702B, 702C, 702D may be representative of any pixels of test depth+multi-spectral image 500. In particular, a first plurality of confidence values 702A for a first pixel 700A indicates that there is a high likelihood that the first pixel is included in a tree, a second plurality of confidence values 702B for a second pixel 700B indicate that there is a high likelihood that the second pixel is included in a bicycle, a third plurality of confidence values 702C for a third pixel 700C indicate that there is a high likelihood that the third pixel is included in a tree, and a fourth plurality of confidence values 702D for a fourth pixel 700D indicate that there is a high likelihood that the fourth pixel is included in a bicycle. Note that any one of these confidence values 702 for each pixel may correspond to the confidence value 302 of FIG. 3. In other words, in some implementations, object recognition machine 300 may be configured to output a confidence value for each pixel of test depth+multi-spectral image 500 without outputting a separate confidence value for the entire test depth+multi-spectral image. In some examples, object recognition machine 300 optionally may be configured to output labels for each pixel that indicate that the pixel is included in a recognized object based on the confidence value for that object being greater than a threshold value (e.g., 75%). Object recognition machine 300 may be configured to output confidence values on a pixel by pixel basis for any suitable number and/or type of different objects.

In some implementations, object recognition machine 300 optionally may be configured to output information related to a test depth+multi-spectral image in which a specified object is recognized in addition to the confidence value 302. In some implementations, object recognition machine 300 optionally may be configured to output locations on the test depth+multi-spectral image of one or more identified 2D features of a recognized object. For example, the 2D feature(s) may include low-level features (e.g., corners, segments) and/or high-level features (e.g., wheels, fork, seat of a bicycle) determined from spectral image data. Object recognition machine 300 optionally may be configured to output locations on the test depth+multi-spectral image of one or more identified 3D features of a recognized object. The 3D feature(s) may include low-level features (e.g., curves) and/or high-level features (e.g., pedals, handlebars of a bicycle) determined from depth data. Object recognition machine 300 optionally may be configured to output locations on the test depth+multi-spectral image of one or more identified spectral features on a recognized object. The spectral feature(s) may be identified based on spectral signatures determined based on a plurality of spectral light values in the plurality of spectral light sub-bands.

Object recognition machine 300 may be configured to include the image labels that indicate the recognized objects included in the test depth+multi-spectral image, the locations (e.g., bounding boxes) of the recognized objects, the pixel-specific labels, and/or any other information produced as a result of analyzing the test depth+multi-spectral image in the matrix of pixels 132 output by the output machine 124 of FIG. 1 and/or another suitable data structure.

Object recognition machine 300 may be implemented as any suitable physical hardware and/or firmware component. In some implementations, camera 100 and object recognition machine 300 may be combined in a shared enclosure. In some implementations, aspects of controller 118 of camera 100 and object recognition machine 300 may be integrated together into one or more hardware-logic components. In some implementations, aspects of object recognition machine 300 may be implemented on a computing device that is remote from camera 100. For example, aspects of object recognition machine 300 may be implemented via a service computing system in communication with camera 100 via a network.

Note that object recognition machine 300 may be configured to output object recognition data to any suitable recipient internal or external to the object recognition machine 300. For example, the object recognition machine 300 may be configured to output object recognition data to another processing component for additional image processing. In some examples, the processing component may be incorporated into the object recognition machine 300. In some examples, the processing component may be incorporated into the camera 100. In some examples, the processing component may be incorporated into a remote computing device in communication with the object recognition machine 300 and/or the camera 100. In another example, object recognition machine 300 may be configured to output object recognition data to an external display device for visual presentation of the object recognition data.

Figure 8:
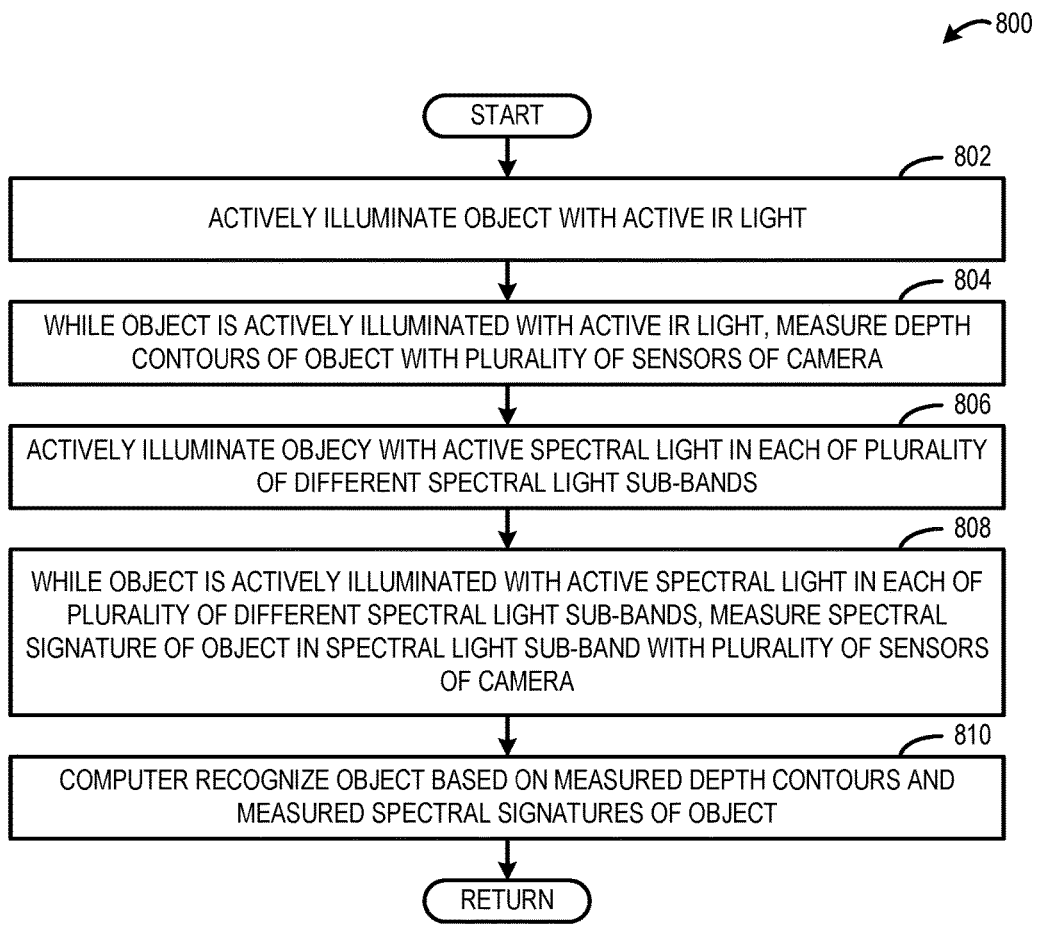
FIG. 8 shows an example object recognition method.

FIG. 8 shows an example object recognition method 800 using depth+multi-spectral camera, such as camera 100 of FIG. 1. For example, method 800 may be enacted by object recognition machine 300 of FIGS. 3-7.

At 802 of method 800, an object is actively illuminated with active IR light. At 804 of method 800, while the object is actively illuminated with active IR light, depth contours of the object are measured with a plurality of sensors of a camera. At 806, the object is actively illuminated with active spectral light in each of a plurality of different spectral light sub-bands. In other words, the object may be illuminated with active spectral light in one spectral light sub-band of the plurality of different spectral light sub-bands at a time until the object has been successively illuminated with active spectral light in each of the plurality of different spectral light sub-bands. At 808 of method 800, while the object is actively illuminated with active spectral light in each of the plurality of different spectral light sub-bands, a spectral signature of the object is measured in each of the plurality of different spectral light sub-bands with the plurality of sensors of the camera. In other words, the same sensors of the same camera are used to measure the depth contours of the object and the spectral signatures of the object in the plurality of different spectral light sub-bands. At 810 of method 800, the object is computer recognized based on the measured depth contours and the measured spectral signatures. The object may be computer recognized in any suitable manner. For example, the object may be computer recognized using one or more previously trained artificial neural networks or statistical models as discussed above.

The techniques discussed herein may be broadly applied to object recognition to provide a performance benefit of increasing accuracy of recognition at least by reducing or removing ambient light interference from captured images used for training and testing of such machine-learning object recognition machines.

In some implementations, the methods and processes described herein may be tied to a computing system of one or more computing devices. In particular, such methods and processes may be implemented as a computer-application program or service, an application-programming interface (API), a library, and/or other computer-program product.

Figure 9:
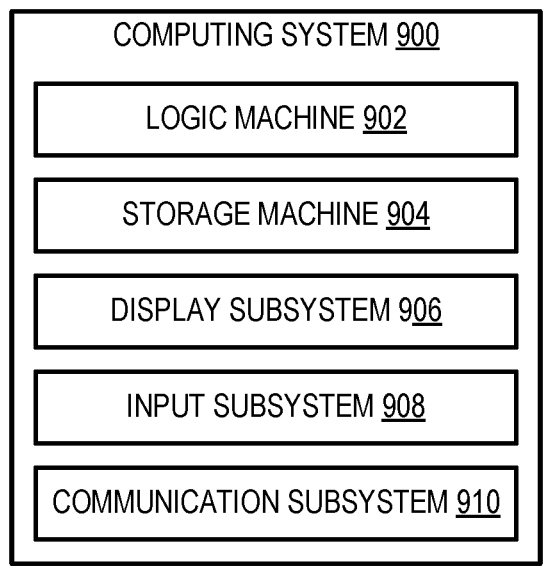
FIG. 9 shows an example computing system.

FIG. 9 schematically shows a non-limiting implementation of a computing system 900 that can enact one or more of the methods and processes described above. Computing system 900 is shown in simplified form. For example, computing system 900 may take the form of camera 100 or electronic controller 118 of FIG. 1, as well as object recognition machine 300 of FIGS. 3-7.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 902 may include one or more processors configured to execute software instructions. Additionally or alternatively, the logic machine 902 may include one or more hardware or firmware logic machines configured to execute hardware or firmware instructions. Processors of the logic machine 902 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 902 may be virtualized and executed by remotely accessible, networked computing devices configured in a cloud-computing configuration.

Storage machine 904 includes one or more physical devices configured to hold instructions executable by the logic machine 902 to implement the methods and processes described herein. When such methods and processes are implemented, the state of storage machine 904 may be transformed—e.g., to hold different data.

Storage machine 904 may include semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by storage machine 904. This visual representation may take the form of display images translating matrix of pixels 132 into a visual format perceivable by a human. As the herein described methods and processes change the data held by the storage machine, and thus transform the state of the storage machine, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, or such display devices may be peripheral display devices.

When included, input subsystem 908 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem 910 may be configured for communication via a wireless telephone network, or a wired or wireless local- or wide-area network. In some embodiments, the communication subsystem 910 may allow computing system 900 to send and/or receive messages to and/or from other devices via a network such as the Internet.

In an example, a camera comprises a sensor array including a plurality of sensors, an infrared (IR) illuminator configured to emit active IR light in an IR light sub-band, a plurality of spectral illuminators, each spectral illuminator configured to emit active spectral light in a different spectral light sub-band, a depth controller machine configured to determine a depth value for each of the plurality of sensors based on the active IR light, a spectral controller machine configured to, for each of the plurality of sensors, determine a spectral value for each spectral light sub-band of the plurality of spectral illuminators, and an output machine configured to output a test depth+multi-spectral image including a plurality of pixels, each pixel corresponding to one of the plurality of sensors of the sensor array and including at least a depth value, and a spectral value for each spectral light sub-band of the plurality of spectral illuminators, an object recognition machine previously trained with a set of labeled training depth+multi-spectral images having a same structure as the test depth+multi-spectral image, the object recognition machine configured to output a confidence value indicating a likelihood that the test depth+multi-spectral image includes a specified object. In this example and/or other examples, the object recognition machine may be further configured to output a confidence value corresponding to each of a plurality of different types of objects, each confidence value indicating the likelihood that the test depth+multi-spectral image includes that type of object. In this example and/or other examples, the object recognition machine may be further configured to output a location on the test depth+multi-spectral image of each recognized object. In this example and/or other examples, the object recognition machine may be further configured to output, for each pixel of the test depth+multi-spectral image, a plurality of confidence values corresponding to the plurality of different types of objects, each confidence value indicating a likelihood that the pixel is included in that type of object. In this example and/or other examples, each spectral value may be determined based on the depth value determined for the sensor that corresponds to the pixel. In this example and/or other examples, the object recognition machine may be configured to use a convolutional neural network to determine the confidence value. In this example and/or other examples, the object recognition machine may include a plurality of input nodes, each input node may be configured to receive a pixel value array corresponding to a different pixel of the plurality of pixels of the test depth+multi-spectral image, and the pixel value array may include the depth value and the plurality of multi-spectral values for the pixel. In this example and/or other examples, the plurality of multi-spectral values for the pixel may include more than three spectral values. In this example and/or other examples, the output machine may be configured to output a surface normal for each pixel of the test depth+multi-spectral image, and the pixel value array may include the surface normal. In this example and/or other examples, the output machine may be configured to output a curvature for each pixel of the test depth+multi-spectral image, and the pixel value array may include the curvature. In this example and/or other examples, the object recognition machine may be configured to use a plurality of models to determine the confidence value, the plurality of models may include a plurality of channel-specific models, each channel-specific model may be configured to process a different pixel parameter for the plurality of pixels of the test depth+multi-spectral image, each channel-specific model may include a plurality of input nodes, and, for each channel-specific model, each input node may be configured to receive a pixel parameter value for a different pixel of the plurality of pixels of the test depth+multi-spectral image. In this example and/or other examples, the object recognition machine may be configured to use a statistical model to determine the confidence value. In this example and/or other examples, the statistical model may include a nearest neighbor algorithm. In this example and/or other examples, the statistical model may include a support vector machine. In this example and/or other examples, the object recognition machine is further configured to output a location on the test depth+multi-spectral image of a bounding box around the specified object. In this example and/or other examples, the object recognition machine may be further configured to output, for each pixel of the test depth+multi-spectral image, a confidence value indicating a likelihood that the pixel is included in the specified object. In this example and/or other examples, the object recognition machine may be further configured to output one or more of a location on the test depth+multi-spectral image of an identified two-dimensional (2D) feature of the specified object, a location on the test depth+multi-spectral image of an identified three-dimensional (3D) feature of the specified object, and a location on the test depth+multi-spectral image of an identified spectral feature of the specified object. In this example and/or other examples, the plurality of sensors of the sensor array may be differential sensors, and each spectral value may be determined based on a depth value and a differential measurement for that differential sensor.

In an example, a method comprises actively illuminating an object with active IR light, while the object is actively illuminated with active IR light, measuring depth contours of the object with a plurality of sensors of a camera, actively illuminating the object with active spectral light in each of a plurality of different spectral light sub-bands, while the object is actively illuminated with active spectral light in each of the plurality of different spectral light sub-bands, measuring a spectral signature of the object in the spectral light sub-band with the plurality of sensors of the camera used to measure the depth contours of the object, and computer recognizing the object based on the measured depth contours and the measured spectral signatures.

In an example, a camera comprises a sensor array including a plurality of sensors, an infrared (IR) illuminator configured to emit active IR light in an IR light sub-band, a plurality of spectral illuminators, each spectral illuminator configured to emit active spectral light in a different spectral light sub-band, a depth controller machine configured to determine a depth value for each of the plurality of sensors based on the active IR light, a spectral controller machine configured to, for each of the plurality of sensors, determine a spectral value for each spectral light sub-band of the plurality of spectral illuminators, wherein each spectral value is calculated based on the depth value determined for the sensor that corresponds to the pixel, and an output machine configured to output a test depth+multi-spectral image including a plurality of pixels, each pixel corresponding to one of the plurality of sensors of the sensor array and including at least a depth value, and a spectral value for each spectral light sub-band of the plurality of spectral illuminators, and an object recognition machine including a convolutional neural network previously trained with a set of labeled training depth+multi-spectral images having a same structure as the test depth+multi-spectral image, the object recognition machine configured to output a confidence value indicating a likelihood that the test depth+multi-spectral image includes a specified object.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera comprising:
   a sensor array including a plurality of sensors;
   an infrared (IR) illuminator configured to emit active IR light in an IR light sub-band;
   a plurality of spectral illuminators, each spectral illuminator configured to emit active spectral light in a different spectral light sub-band;
   a depth controller machine configured to determine a depth value for each of the plurality of sensors based on the active IR light,
   a spectral controller machine configured to, for each of the plurality of sensors, determine a spectral value for each spectral light sub-band of the plurality of spectral illuminators; and
   an output machine configured to output a test depth+multi-spectral image including a plurality of pixels, each pixel corresponding to one of the plurality of sensors of the sensor array and including at least:
      a depth value, and
      a spectral value for each spectral light sub-band of the plurality of spectral illuminators;
   an object recognition machine previously trained with a set of labeled training depth+multi-spectral images having a same structure as the test depth+multi-spectral image, the object recognition machine configured to output a confidence value indicating a likelihood that the test depth+multi-spectral image includes a specified object.

2. The camera of claim 1, wherein the object recognition machine is further configured to output a confidence value corresponding to each of a plurality of different types of objects, each confidence value indicating the likelihood that the test depth+multi-spectral image includes that type of object.

3. The camera of claim 2, wherein the object recognition machine is further configured to output a location on the test depth+multi-spectral image of each recognized object.

4. The camera of claim 2, wherein the object recognition machine is further configured to output, for each pixel of the test depth+multi-spectral image, a plurality of confidence values corresponding to the plurality of different types of objects, each confidence value indicating a likelihood that the pixel is included in that type of object.

5. The camera of claim 1, wherein each spectral value is determined based on the depth value determined for the sensor that corresponds to the pixel.

6. The camera of claim 1, wherein the object recognition machine is configured to use a convolutional neural network to determine the confidence value.

7. The camera of claim 6, wherein the object recognition machine includes a plurality of input nodes, wherein each input node is configured to receive a pixel value array corresponding to a different pixel of the plurality of pixels of the test depth+multi-spectral image, and wherein the pixel value array includes the depth value and the plurality of multi-spectral values for the pixel.

8. The camera of claim 7, wherein the plurality of multi-spectral values for the pixel include more than three spectral values.

9. The camera of claim 7, wherein the output machine is configured to output a surface normal for each pixel of the test depth+multi-spectral image, and wherein the pixel value array includes the surface normal.

10. The camera of claim 7, wherein the output machine is configured to output a curvature for each pixel of the test depth+multi-spectral image, and wherein the pixel value array includes the curvature.

11. The camera of claim 6, wherein the object recognition machine is configured to use a plurality of models to determine the confidence value, wherein the plurality of models includes a plurality of channel-specific models, wherein each channel-specific model is configured to process a different pixel parameter for the plurality of pixels of the test depth+multi-spectral image, wherein each channel-specific model includes a plurality of input nodes, and wherein, for each channel-specific model, each input node is configured to receive a pixel parameter value for a different pixel of the plurality of pixels of the test depth+multi-spectral image.

12. The camera of claim 1, wherein the object recognition machine is configured to use a statistical model to determine the confidence value.

13. The camera of claim 12, wherein the statistical model includes a nearest neighbor algorithm.

14. The camera of claim 12, wherein the statistical model includes a support vector machine.

15. The camera of claim 1, wherein the object recognition machine is further configured to output a location on the test depth+multi-spectral image of a bounding box around the specified object.

16. The camera of claim 1, wherein the object recognition machine is further configured to output, for each pixel of the test depth+multi-spectral image, a confidence value indicating a likelihood that the pixel is included in the specified object.

17. The camera of claim 1, wherein the object recognition machine is further configured to output one or more of a location on the test depth+multi-spectral image of an identified two-dimensional (2D) feature of the specified object, a location on the test depth+multi-spectral image of an identified three-dimensional (3D) feature of the specified object, and a location on the test depth+multi-spectral image of an identified spectral feature of the specified object.

18. The camera of claim 1, wherein the plurality of sensors of the sensor array are differential sensors, and wherein each spectral value is determined based on a depth value and a differential measurement for that differential sensor.

19. A method comprising:
  actively illuminating an object with active IR light;
  while the object is actively illuminated with active IR light, measuring depth contours of the object with a plurality of sensors of a camera;
  actively illuminating the object with active spectral light in each of a plurality of different spectral light sub-bands;
  while the object is actively illuminated with active spectral light in each of the plurality of different spectral light sub-bands, measuring a spectral signature of the object in the spectral light sub-band with the plurality of sensors of the camera used to measure the depth contours of the object; and
  computer recognizing the object based on the measured depth contours and the measured spectral signatures.

20. A camera comprising:
  a sensor array including a plurality of sensors;
  an infrared (IR) illuminator configured to emit active IR light in an IR light sub-band;
  a plurality of spectral illuminators, each spectral illuminator configured to emit active spectral light in a different spectral light sub-band;
  a depth controller machine configured to determine a depth value for each of the plurality of sensors based on the active IR light,
  a spectral controller machine configured to, for each of the plurality of sensors, determine a spectral value for each spectral light sub-band of the plurality of spectral illuminators, wherein each spectral value is calculated based on the depth value determined for the sensor that corresponds to the pixel; and
  an output machine configured to output a test depth+multi-spectral image including a plurality of pixels, each pixel corresponding to one of the plurality of sensors of the sensor array and including at least:
    a depth value, and
    a spectral value for each spectral light sub-band of the plurality of spectral illuminators; and
  an object recognition machine including a convolutional neural network previously trained with a set of labeled training depth+multi-spectral images having a same structure as the test depth+multi-spectral image, the object recognition machine configured to output a confidence value indicating a likelihood that the test depth+multi-spectral image includes a specified object.

* * * * *